United States Patent
White

(10) Patent No.: US 9,707,876 B2
(45) Date of Patent: Jul. 18, 2017

(54) CHAIR-MOUNTED WARMING WRAP

(71) Applicant: Bengoora LLC, Kingston, NH (US)

(72) Inventor: Majella White, Kingston, NH (US)

(73) Assignee: Bengoora LLC, Kingston, NH (US)

( * ) Notice: Subject to any disclaimer, the term of this patent is extended or adjusted under 35 U.S.C. 154(b) by 0 days.

(21) Appl. No.: 15/080,636

(22) Filed: Mar. 25, 2016

(65) Prior Publication Data

US 2016/0288679 A1    Oct. 6, 2016

Related U.S. Application Data

(60) Provisional application No. 62/142,541, filed on Apr. 3, 2015.

(51) Int. Cl.
*B60N 2/60* (2006.01)
*B60R 21/207* (2006.01)

(52) U.S. Cl.
CPC ......... *B60N 2/6009* (2013.01); *B60N 2/6027* (2013.01); *B60N 2/6036* (2013.01); *B60R 21/207* (2013.01)

(58) Field of Classification Search
USPC ...................................................... 280/730.1
See application file for complete search history.

(56) References Cited

U.S. PATENT DOCUMENTS

| | | | |
|---|---|---|---|
| 2,712,133 A * | 7/1955 | Coleman ................ | A61G 5/10 2/69 |
| 5,551,109 A * | 9/1996 | Tingley ................ | A47D 13/02 128/870 |
| 6,764,134 B1 * | 7/2004 | Crescenzi ............. | A47C 31/00 2/69 |
| 7,581,259 B2 * | 9/2009 | Thompson ............. | A47G 9/066 2/69.5 |
| 7,779,492 B2 * | 8/2010 | Mangano ............... | A47C 7/383 5/417 |
| 8,079,099 B1 * | 12/2011 | Brown .................. | A47G 9/066 2/69.5 |
| 8,556,337 B1 * | 10/2013 | Cornitius-Cary ...... | A47C 7/021 224/275 |
| 2002/0129445 A1 * | 9/2002 | Deering ................ | A47G 9/066 5/482 |
| 2006/0117455 A1 * | 6/2006 | Park ........................ | A41D 3/08 2/69.5 |

(Continued)

*Primary Examiner* — Darlene P Condra
(74) *Attorney, Agent, or Firm* — Maine Cernota & Rardin

(57) ABSTRACT

An apparatus includes a central panel attachable to a seatback and at least one flexible, insulating wing cooperative with the central panel that can be wrapped around a seated user for warmth. The central panel can be strapped to the seatback, or can be part of a central pocket that fits over the seatback. The central pocket can include solid net polyester and/or an elastic material such as polyester spandex. The wings can include tweed, micro-velvet, fleece, and/or imitation fur. In embodiments, when not in use, the wings can be stowed behind the seatback by hook-and-loop attachment or by insertion into a rear stowage pouch. In some automotive embodiments, the central pocket can include a top opening through which a head restraint of a front or rear seat can extend. Various automotive embodiments include a side opening through which a side-impact airbag installed in the seatback can be deployed.

14 Claims, 7 Drawing Sheets

(56) References Cited

U.S. PATENT DOCUMENTS

2007/0061965 A1\* 3/2007 Crawford ............... A47G 9/086
　　　　　　　　　　　　　　　　　　　　　　5/413 R
2015/0102645 A1\* 4/2015 Rogan .................. B60N 2/6063
　　　　　　　　　　　　　　　　　　　　　　297/228.11

\* cited by examiner

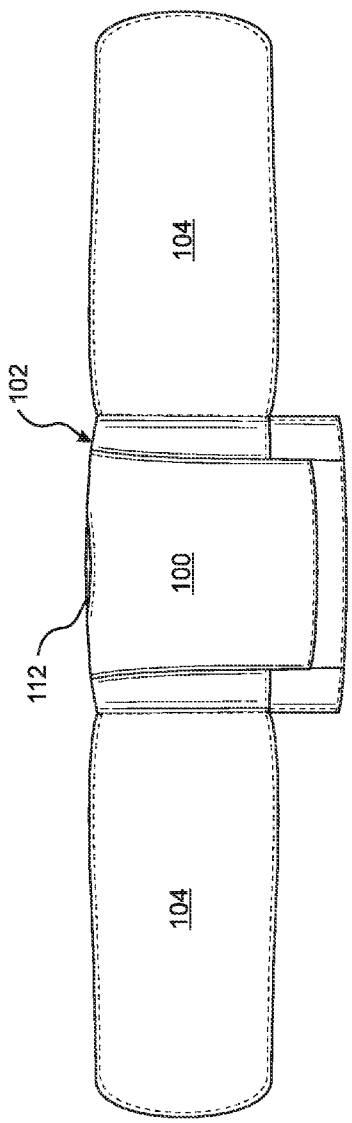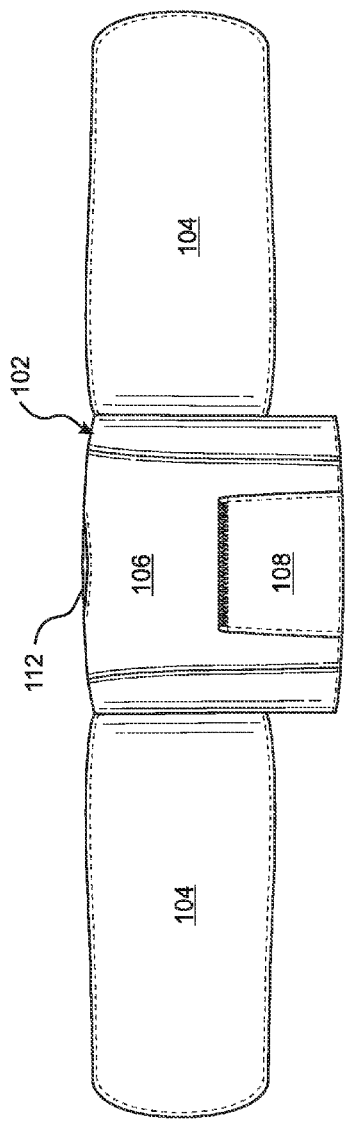

CHAIR-MOUNTED WARMING WRAP

RELATED APPLICATIONS

This application claims the benefit of U.S. Provisional Application No. 62/142,541, filed Apr. 3, 2015, which is herein incorporated by reference in its entirety for all purposes.

FIELD OF THE INVENTION

The invention relates to personal warming apparatus, and more particularly, to wearable cloth wraps.

BACKGROUND OF THE INVENTION

It is well known that a person's heartbeat and metabolism are typically accelerated when the person is active and moving about, and tend to slow down when the person is at rest. For this reason, it is a common experience to feel comfortable with the ambient temperature while active, and yet to feel uncomfortably cool after sitting in one place for a while.

Of course, if this happens while sitting at home or at the office, it is a simple matter to rise and fetch a coat, sweater, wrap, or blanket to be worn while sitting, and/or to adjust the thermostat controlling the ambient temperature. However, once a person is comfortably settled and at rest, the person may wish to avoid having to get up again if possible. Accordingly, it is not uncommon for sweaters, wraps, or blankets to be strategically placed on or near chairs, so that a sitting person who begins to feel cold can make use of the sweater, wrap, or blanket without having to get up.

However, sweaters, blankets, etc., that are placed on or near a chair or other furniture can take up space, become disheveled, and even fall to the floor behind the furniture, where they may be inconvenient to retrieve.

The situation can be even worse when riding in a vehicle, because of the limited mobility that is available to an occupant of a vehicle, the difficulty of twisting and reaching into the back seat to retrieve a coat or sweater, and the limited storage space inside of many vehicles, which can make it preferable to place outer garments in a rear storage area where they are not within reach of passengers. Furthermore, even if a vehicle occupant is able to retrieve an outer garment or wrap, for example from the back seat, it can nevertheless be very difficult for the occupant to put the garment on or to position the wrap as desired, especially if the vehicle is in motion and the user does not wish to release his or her seatbelt.

Of course, one approach is simply to adjust the heating system in the vehicle to provide a desired temperature. However, the ideal vehicle temperature for a passenger may not be the same as for the driver, due to differences in the amount of clothing being worn and differences in the air flow within the vehicle, as well as differences in metabolism, age, and body type.

What is needed, therefore, is an apparatus that provides an easily accessible and always-available means for increasing the thermal insulation surrounding a sitting person, without requiring the user to rise from sitting, and without filling valuable space with bulky materials when the apparatus is not in use.

SUMMARY OF THE INVENTION

An apparatus is disclosed that provides an easily accessible and always available means for increasing the thermal insulation surrounding a sitting person, without requiring the user to rise from sitting, and without filling valuable space with bulky materials when the apparatus is not in use. The apparatus includes a central panel and a mechanism for fixing the central panel to the back of a chair or seat (referred to generically herein as a "seatback"). In some embodiments, the central panel is the front panel of a central pocket that fits over at least an upper portion of the seatback. In other embodiments, the central panel is attached to the seatback by straps, snaps, hook-and-loop, or any other attachment means known in the art.

The apparatus further includes at least one thermally insulating "wing" attached to a side of the central panel, and configured so that it can be easily grasped by a user sitting in the seat and pulled across the user, thereby providing warmth in the manner of a blanket or wrap. In embodiments, a wing is provided on each side of the central panel, such that both wings can be wrapped over the user to provide full, overlapping coverage of the user by the wings. In certain embodiments a wing fastening mechanism is included, such as hook-and-loop fastening of a pair of overlapping wings to each other when wrapped around the user.

Embodiments of the present invention further include a stowage mechanism that can maintain the wings in a stowed configuration behind the seatback when not in use. In some of these embodiments, the stowage mechanism is a stowage pouch provided behind the seatback. For example, in some embodiments the stowage pouch is attached to or integral with a rear panel of the central pocket. In other embodiments, the stowage mechanism is a mechanism for fixing the wings to each other, to the seatback, or to the central pocket. For example, in some embodiments hook-and-loop attachment is used to attach the wings to the rear panel of the central pocket when the wings are not in use.

Various embodiments further include a wing fastening mechanism that can maintain the at least one wing in place when wrapped over the seated user. For example, some embodiments include a hook-and-loop mechanism for attaching a pair of overlapping wings to each other when wrapped around a seated user. And certain embodiments include a hood that is attached to the top of the central panel and configured to hang down behind the seatback when not in use, and to be pulled over a user's head when needed.

In some embodiments that comprise a central pocket, the central pocket includes a solid net polyester or an elastic material such as a polyester spandex. In various embodiments, the wings include a thermally insulating fabric such as wool blend tweed, and/or a fleece such as blizzard fleece or sweatshirt fleece. Other embodiments comprise a micro-velvet fabric and/or faux fur. Various colors of yarn can be incorporated into fabrics used in embodiments, and/or various patterns, and/or prints can be applied to visible surfaces of embodiments to provide a desired appearance.

Certain embodiments intended for use on front or rear seats in vehicles include a pair of holes or a slit or opening at the top of the central pocket to allow the vehicle's head restraint to extend above and beyond the central pocket. Also, a slit or other opening can be positioned along a side of the central pocket or panel so as to allow a side impact airbag installed in the seatback to be deployed without interference from the invention. In some of these embodiments the slit is open, while in other embodiments it is held shut by a frangible means, such as a breakable sewn seam, which allows the airbag to burst through when needed.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1A is an illustration from the front of an embodiment of the present invention laid out on flat and not installed on a seatback;

FIG. 1B is an illustration from the rear of the embodiment of FIG. 1A, laid out on flat and not installed on a seatback;

DETAILED DESCRIPTION

Figure 1C:
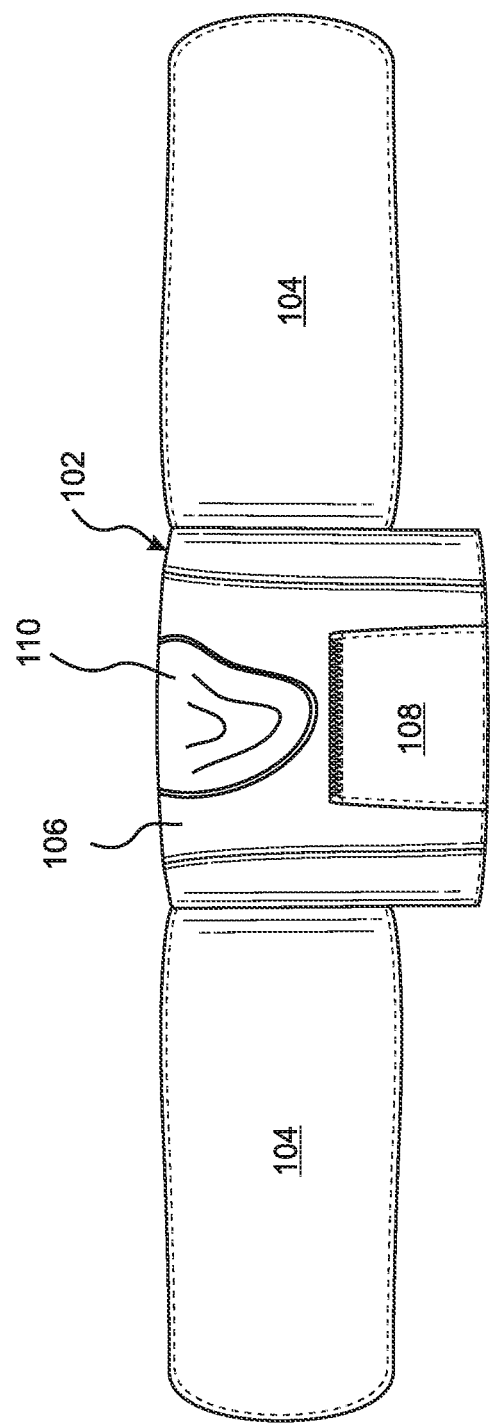
FIG. 1C is an illustration from the front of an embodiment similar to FIG. 1A, but including a hood for covering a user's head, the embodiment being laid out on flat and not installed on a seatback.

The present invention is an apparatus that provides an easily accessible and always available means for increasing the thermal insulation surrounding a sitting person, without requiring the user to rise from sitting, and without filling valuable space with bulky materials when the apparatus is not in use. With reference to the front and rear views of FIGS. 1A and 1B, the apparatus includes a central panel 100 and a mechanism for fixing the central panel to the back 200 of a chair or seat (referred to generically herein as a "seatback"). In the embodiment of FIGS. 1A and 1B, the central panel 100 joined with a rear panel 106 to form a central pocket 102 that fits over at least an upper portion of the seatback. In other embodiments, the central panel 100 is attached to the seatback by straps, snaps, hook-and-loop, or any other attachment means known in the art.

The apparatus further includes at least one thermally insulating "wing" 104 attached to a side of the central panel 100, and configured so that it can be easily grasped by a user sitting in the seat and pulled across the user, thereby providing warmth in the manner of a blanket or wrap. In the embodiment of FIGS. 1A and 1B, a wing 104 is provided on each side of the central panel 100, such that both wings 104 can be wrapped over the user to provide full, overlapping coverage of the user by the wings 104. In certain embodiments a wing fastening mechanism is included, such as hook-and-loop fastening of a pair of overlapping wings 104 to each other when wrapped around the user.

Embodiments of the present invention further include a stowage mechanism 108 that can maintain the wings 100 in a stowed configuration behind the seatback when not in use. In the embodiment of FIGS. 1A and 1B, the stowage mechanism is a stowage pouch 108 attached to the rear panel 106 of the central pocket 102 behind the seatback. In other embodiments, the stowage mechanism is a mechanism for fixing the wings 104 to each other, to the seatback, or to the central pocket 102. For example, in some embodiments hook-and-loop attachment is used to attach the wings 104 to the rear panel 106 of the central pocket 102 when the wings 104 are not in use.

Various embodiments further include a wing fastening mechanism that can maintain the at least one wing 104 in place when wrapped over the seated user. For example, some embodiments include a hook-and-loop mechanism for attaching a pair of overlapping wings 104 to each other when wrapped around a seated user. Such hook and loop attachment may be preferred, for example, in embodiments intended for use at home or in an office, where the surrounding space is relatively unrestricted, whereas for vehicle embodiments attachment of the wings 104 to each other may be considered too constraining of the passenger. However, vehicle embodiments that provide for attachment of the wings 104 to each other are nevertheless included within the scope of the invention.

FIG. 1C is a rear view of an embodiment similar to FIG. 1B that includes a hood 110 attached to the top of the central panel 100 and configured to hang down behind the seatback when not in use, and to be pulled over a user's head when needed.

Figure 2:
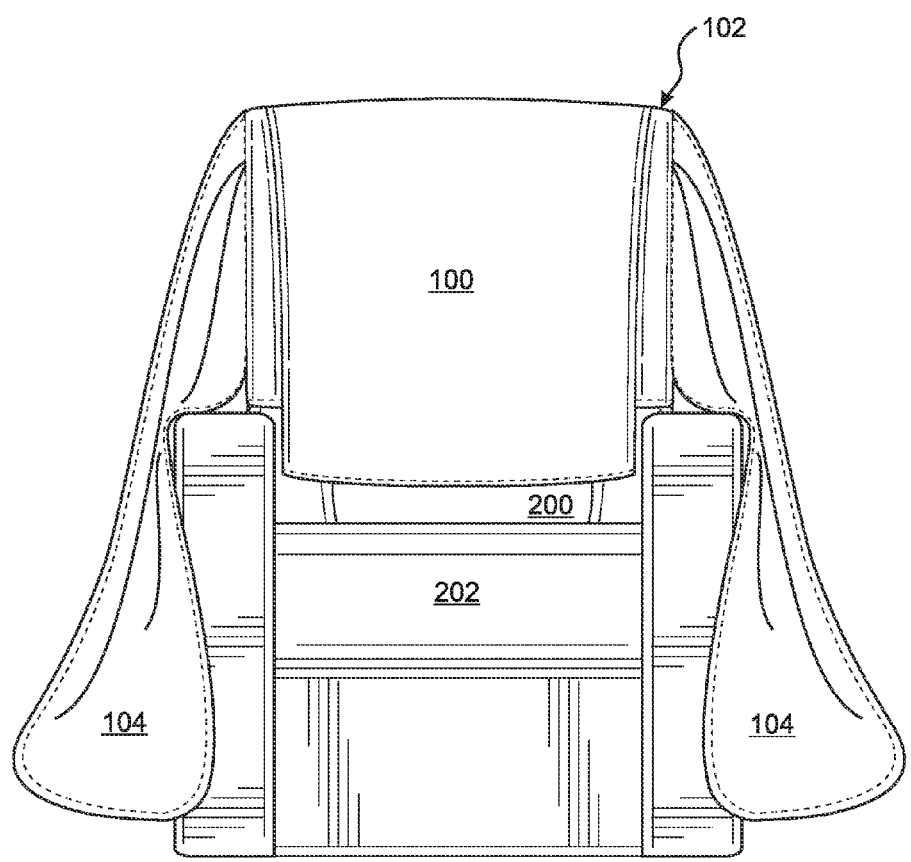
FIG. 2 is a perspective view from the front of an embodiment similar to FIG. 1A installed on a seat.

FIG. 2 is a perspective view from the front of an embodiment similar to the embodiment of FIGS. 1A and 1B installed on the seatback 200 of a chair 202. The wings 104 are shown in the figure draped loosely on each side and ready to be used.

Figure 3:
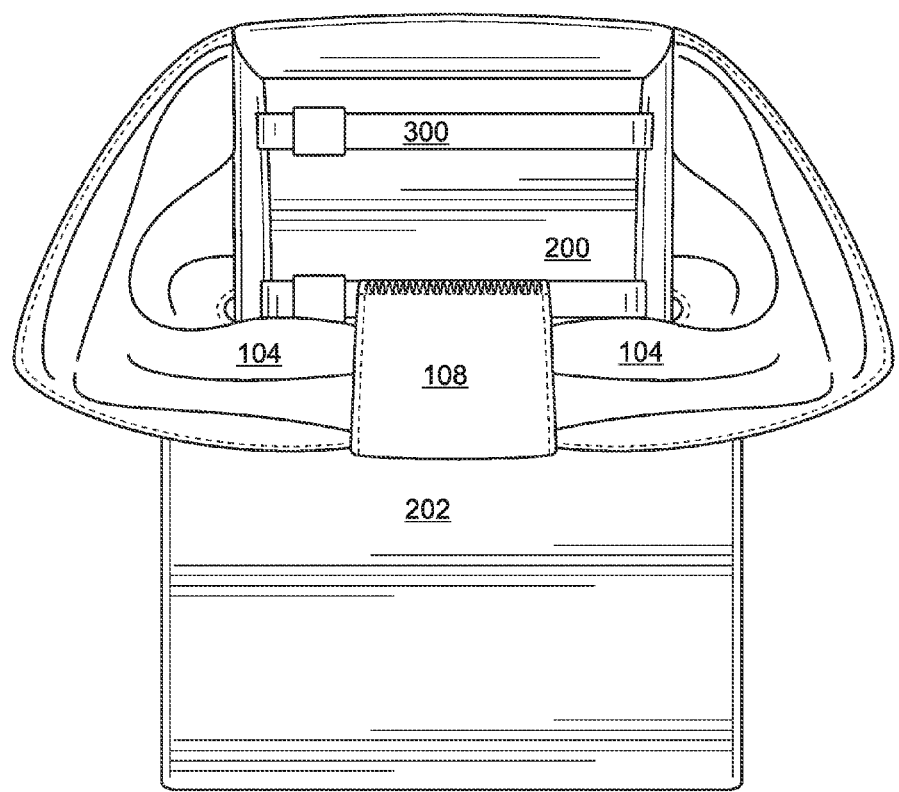
FIG. 3 is a perspective view from the rear of an embodiment installed on a seat in which the central panel of the embodiment is attached to the seatback by straps.

FIG. 3 is a perspective view from the rear of an embodiment in which the front panel 100 is attached to the seatback 200 by straps 300. In this embodiment, the storage pouch 108 for the wings 104 is suspended from one of the straps 300.

In some embodiments that comprise a central pocket 102, the central pocket 102 includes a solid net polyester or an elastic material such as a polyester spandex that secures the central pocket to the seatback 200. In various embodiments, the wings 104 include a thermally insulating fabric such as a wool blend tweed, and/or a fleece such as blizzard fleece or sweatshirt fleece. Other embodiments comprise a microvelvet fabric and/or faux fur. Various colors of yarn can be incorporated into fabrics used in embodiments, and/or various patterns, and/or prints can be applied to visible surfaces of embodiments to provide a desired appearance.

Figure 4:
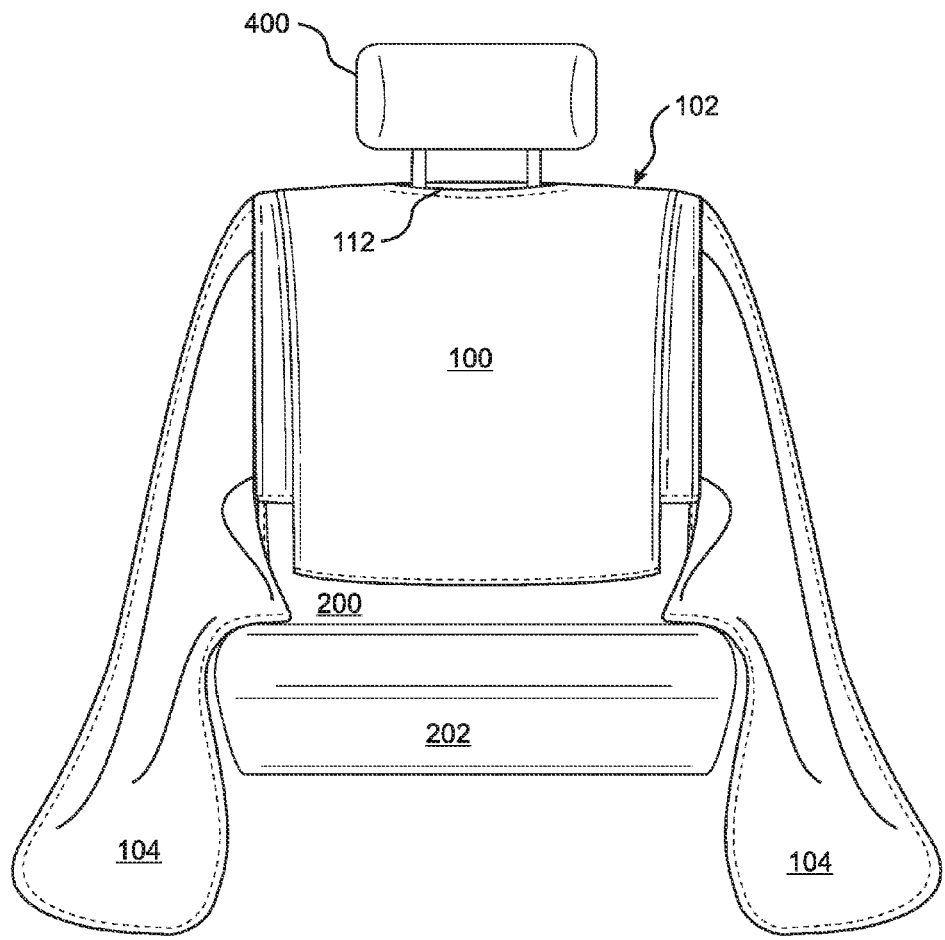
FIG. 4 is a perspective view from the front of the embodiment of FIG. 1A installed on the passenger seat of a vehicle.
Figure 5:
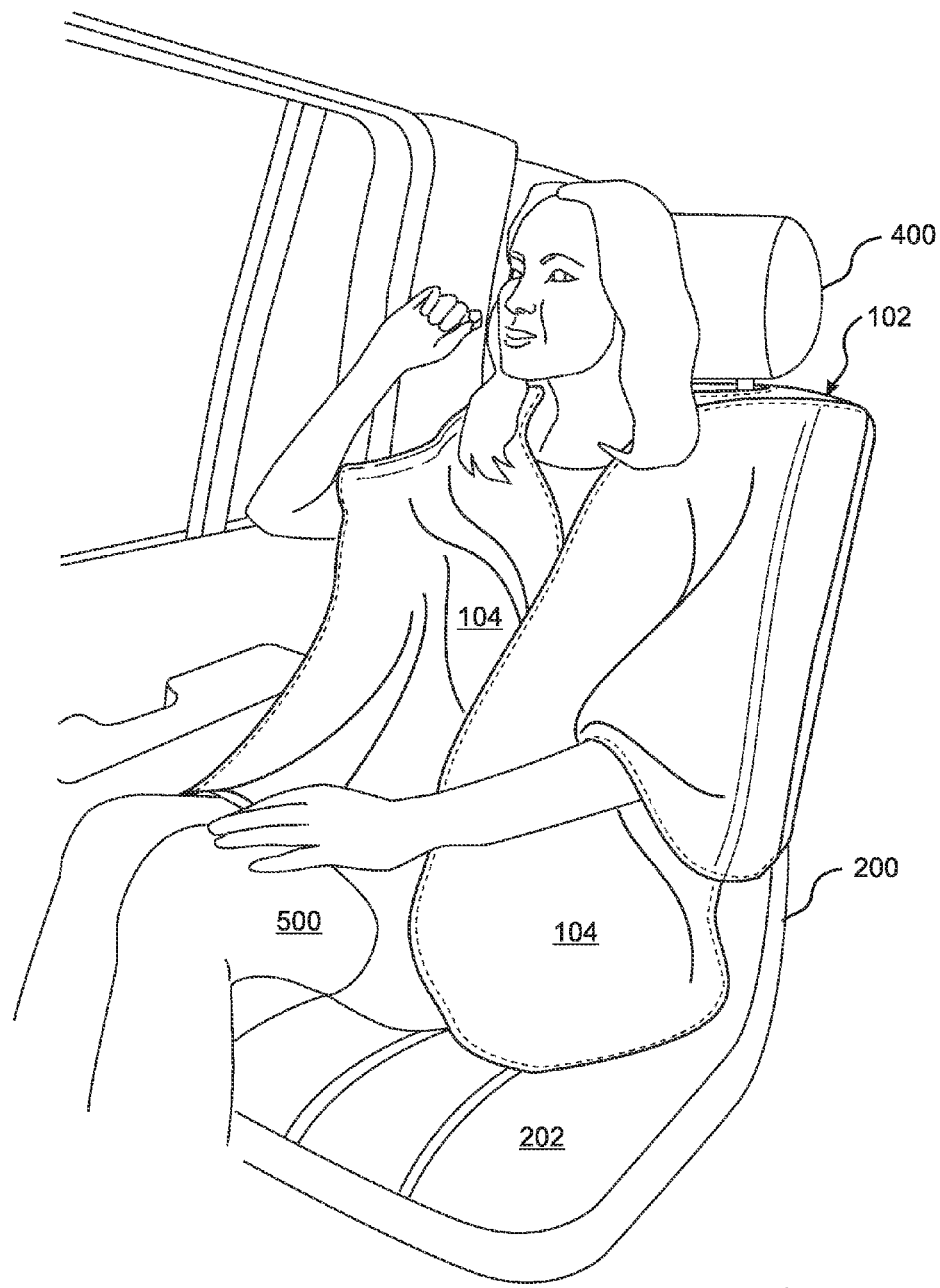
FIG. 5 is a perspective view from the front left of a sitting person using the embodiment of FIG. 4.

With reference again to FIGS. 1A and 1B, certain embodiments intended for use on front or rear seats in vehicles include a pair of holes or, as is illustrated in the figures, a slit 112 or opening at the top of the central pocket 100 to allow the vehicle's head restraint 400 to extend above and beyond the central pocket 102. FIG. 4 is a perspective view from the front of the embodiment of FIGS. 1A and 1B installed on a vehicle passenger seat. FIG. 5 is a perspective view from the front left side of the embodiment of FIG. 4 being used by a passenger 500 riding in a vehicle. Note that the illustrated embodiment is intended for use only on the passenger side of the vehicle.

Figure 6:
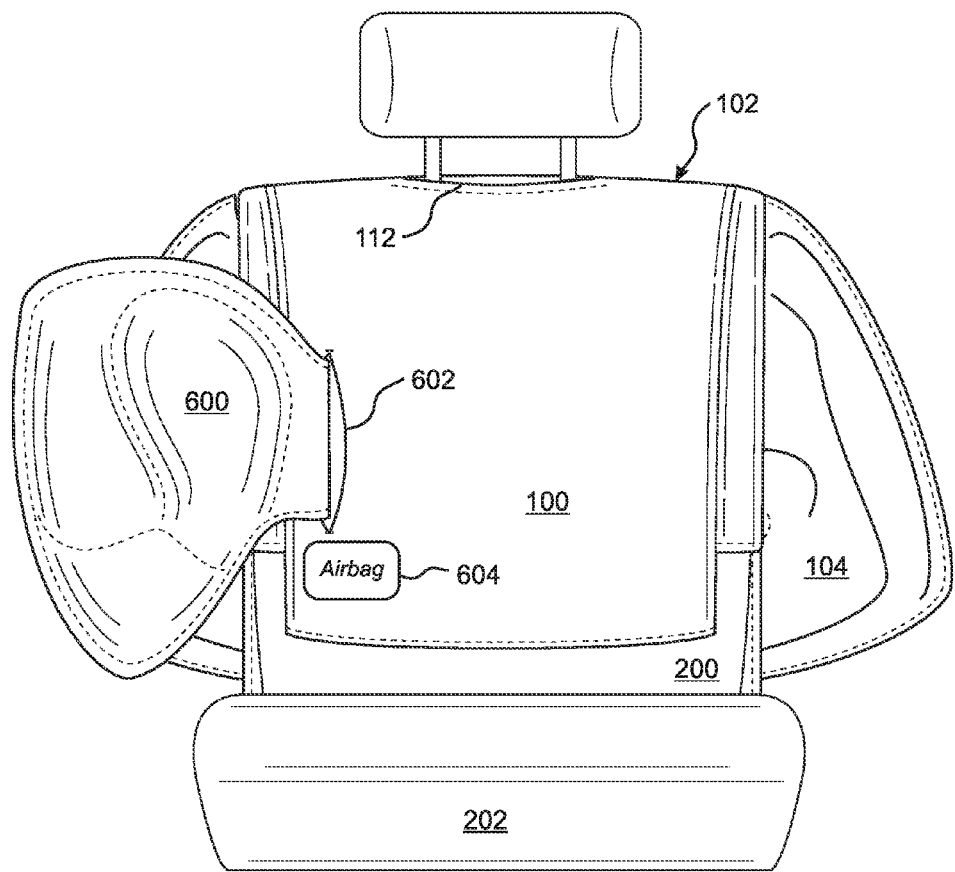
FIG. 6 is a perspective view from the front of an embodiment installed in a vehicle passenger seat that includes an opening to allow a side-impact airbag installed in the seatback to deploy, the airbag being shown deployed through the opening.

With reference to FIG. 6, for additional compatibility with vehicles that include side-impact airbags 600 installed in seats, a slit 602 or other opening can be positioned along a side of the central pocket or panel 100 so as to allow a side impact airbag 600 installed in the seatback 200 to be deployed without interference from the invention. In the embodiment of FIG. 6, a perceptible tag 604 is included, which indicates to users that the embodiment is configured for use on a seat in which a side-impact airbag is installed. In various embodiments such as FIG. 6 that are intended for use with airbags, the wing 104 that overlaps the airbag slit 602 is attached to the central panel 100 in a manner that allows the wing 104 to easily detach from the central panel 100 upon deployment of the airbag 600, so that the wing 104 does not interfere with deployment of the airbag 600 even if it is in use and extended over the airbag slit 602. In some of these embodiments, the wing 104 is attached to the central panel 100 by a mono-filament thread that is frangible during deployment of the airbag. In other embodiments, the slit 602 and wing 104 are arranged such that the slit 602 is open and not blocked by the wing 104.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application.

This specification is not intended to be exhaustive. Although the present application is shown in a limited number of forms, the scope of the invention is not limited to just these forms, but is amenable to various changes and modifications without departing from the spirit thereof. One or ordinary skill in the art should appreciate after learning the teachings related to the claimed subject matter contained in the foregoing description that many modifications and variations are possible in light of this disclosure. Accordingly, the claimed subject matter includes any combination of the above-described elements in all possible variations thereof, unless otherwise indicated herein or otherwise clearly contradicted by context. In particular, the limitations presented in dependent claims below can be combined with their corresponding independent claims in any number and in any order without departing from the scope of this disclosure, unless the dependent claims are logically incompatible with each other.

I claim:

1. Apparatus for providing thermal insulation to a person sitting in a front or rear seat in a vehicle, said seat having a substantially vertical seatback, the apparatus comprising:
   a central panel;
   an attachment mechanism configured for attaching the central panel to the seatback;
   an opening in the central panel configured to enable deployment through the opening of a side impact airbag installed in the seatback; and
   at least one flexible wing extending from a side of the central panel, the wing having dimensions that enable it to extend across a front portion of the sitting person.

2. The apparatus of claim 1, wherein the apparatus comprises a pair of wings extending from either side of the central panel.

3. The apparatus of claim 1, wherein the apparatus further includes a hood cooperative with the central panel and configured for placement over the head of the sitting person.

4. The apparatus of claim 1, wherein the central panel is a front panel of a central pocket that is configured to be placed over at least an upper portion of the seatback.

5. The apparatus of claim 4, wherein the central pocket includes a top configured to cover a top of the seatback, the top of the central pocket including at least one opening configured to allow a headrest or head restraint attached to the seatback to extend above the top of the central pocket.

6. The apparatus of claim 4, further comprising at least one strap configured to compress the central pocket against the seatback.

7. The apparatus of claim 4, wherein the central pocket includes an elastic material that must be expanded when installing the central pocket over the seatback.

8. The apparatus of claim 1, further comprising a stowage mechanism configured to maintain the at least one wing in a stowed configuration behind the seatback when the wing is not in use.

9. The apparatus of claim 8, wherein the stowage mechanism includes a pouch located behind the seatback into which a portion of the at least one wing can be inserted when not in use.

10. The apparatus of claim 9, wherein the central panel is a front panel of a central pocket that is configured to be placed over and surround at least a portion of the seatback, and the pouch is attached to a rear panel of the central pocket.

11. The apparatus of claim 9, wherein the pouch further comprises a compartment in which items unrelated to the apparatus can be stored.

12. The apparatus of claim 1, wherein the at least one wing comprises fleece.

13. The apparatus of claim 12, wherein the fleece includes at least one of blizzard fleece and sweatshirt fleece.

14. The apparatus of claim 1, wherein the central panel comprises at least one of polymer spandex and solid net polyester.

* * * * *